United States Patent
Tanabe

(10) Patent No.: US 9,724,967 B2
(45) Date of Patent: Aug. 8, 2017

(54) RUBBER COMPOSITION AND PNEUMATIC TIRE USING THE SAME

(71) Applicant: The Yokohama Rubber Co., LTD., Minato-ku, Tokyo (JP)

(72) Inventor: Yusuke Tanabe, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 170 days.

(21) Appl. No.: 14/436,072

(22) PCT Filed: Oct. 9, 2013

(86) PCT No.: PCT/JP2013/077484
§ 371 (c)(1),
(2) Date: Apr. 15, 2015

(87) PCT Pub. No.: WO2014/061526
PCT Pub. Date: Apr. 24, 2014

(65) Prior Publication Data
US 2015/0314645 A1      Nov. 5, 2015

(30) Foreign Application Priority Data
Oct. 15, 2012  (JP) ................................. 2012-228300

(51) Int. Cl.
| | |
|---|---|
| *C08K 5/00* | (2006.01) |
| *B60C 1/00* | (2006.01) |
| *B60C 11/00* | (2006.01) |
| *C08K 5/47* | (2006.01) |
| *C08K 3/06* | (2006.01) |
| *C08K 3/36* | (2006.01) |
| *C08K 5/36* | (2006.01) |
| *C08K 5/548* | (2006.01) |
| *C08K 5/57* | (2006.01) |
| *C08K 3/08* | (2006.01) |
| *C08K 3/04* | (2006.01) |

(52) U.S. Cl.
CPC ........ *B60C 1/0016* (2013.01); *B60C 11/0008* (2013.04); *C08K 3/04* (2013.01); *C08K 3/06* (2013.01); *C08K 3/08* (2013.01); *C08K 3/36* (2013.01); *C08K 5/36* (2013.01); *C08K 5/47* (2013.01); *C08K 5/548* (2013.01); *C08K 5/57* (2013.01); *B60C 2011/0025* (2013.04); *C08K 2003/045* (2013.01)

(58) Field of Classification Search
CPC ... C08K 3/04; C08K 3/36; C08K 5/57; C08K 5/47; C08K 5/548; C08K 5/00
See application file for complete search history.

(56) References Cited

FOREIGN PATENT DOCUMENTS

| | | |
|---|---|---|
| JP | S58-032645 | 2/1983 |
| JP | S60-195152 | 10/1985 |
| JP | S63-161040 | 7/1988 |
| JP | S63-301242 | 12/1988 |
| JP | H08-020675 | 1/1996 |
| JP | 2001-131375 | 5/2001 |
| JP | 2004-075902 | 3/2004 |
| JP | 2004-161851 | 6/2004 |
| JP | 3913346 | 5/2007 |
| JP | 2010-209197 | 9/2010 |
| JP | 2011-057946 | 3/2011 |
| WO | WO 2007/119675 | 10/2007 |

OTHER PUBLICATIONS

International Search Report for International Application No. PCT/JP2013/077484 dated Jan. 7, 2014, 4 pages, Japan.

*Primary Examiner* — Peter D Mulcahy
(74) *Attorney, Agent, or Firm* — Thorpe North & Western

(57) ABSTRACT

The present technology provides a rubber composition wherein from 1 to 100 parts by mass of carbon black and/or from 10 to 150 parts by mass of inorganic filler, from 1 to 30 parts by mass of sulfur-containing compounding agent, and from 0.1 to 20 parts by mass of tin oxide compound, are blended per 100 parts by mass of sulfur-crosslinkable diene rubber; and a pneumatic tire that uses this rubber composition in a cap tread.

4 Claims, 1 Drawing Sheet

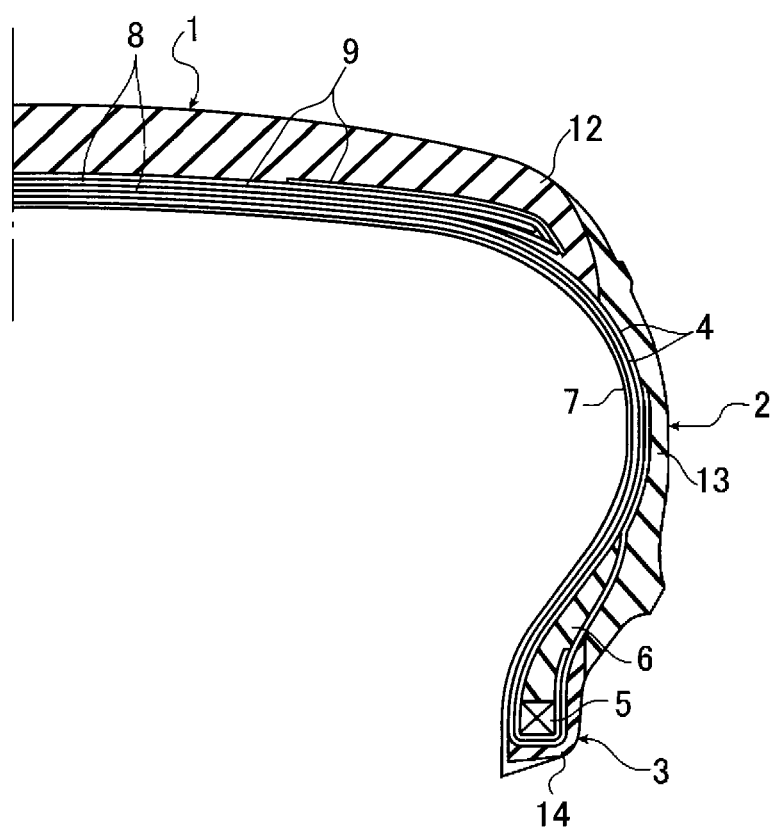

RUBBER COMPOSITION AND PNEUMATIC TIRE USING THE SAME

TECHNICAL FIELD

The present technology relates to a rubber composition and a pneumatic tire using the same.

BACKGROUND

Conventionally, compositions containing tin can be used in rubber compositions for tires and the like (see, e.g., Japanese Unexamined Patent Application Publication No. 2011-57946A, Japanese Patent No. 3913346, or International Patent Publication No. WO/2007/119675).

However, when a rubber composition contains a divalent tin carboxylate like tin bis(2-ethylhexanoate), a tetraalkyl tin (having tetravalent tin), or a dialkyl tin dihalide (having tetravalent tin), the viscosity of the unvulcanized rubber is high, and rubber properties like tensile strength and elongation at break are poor.

SUMMARY

The present technology provides a rubber composition having excellent tensile at break, elongation at break, low heat build-up, and wet grip performance without diminishing workability.

As a result of diligent research to solve the above problems, the present inventors found that although such divalent tin compounds or tetravalent tin compounds accelerate a condensation reaction of a silane coupling agent and silica to an appropriate degree, they reduce tensile at break, elongation at break, and the like. From this result, the present inventors considered whether these tin compounds inhibit chemical reactions between sulfur-containing compounding agents and rubber (for example, chemical reactions between sulfur and rubber, between sulfur-containing vulcanization accelerators and rubber, and between silica and sulfur-containing silane coupling agents and rubber; similarly below) or do not accelerate chemical reactions between sulfur-containing compounding agents and rubber. Thus, the present inventors proceeded with further research, and discovered that by blending a sulfur-containing compounding agent and a tin oxide compound into a sulfur-crosslinkable diene rubber, the chemical reactions between sulfur and rubber, between sulfur-containing vulcanization accelerators and rubber, and between silica and sulfur-containing silane coupling agents and rubber, including the chemical reaction between the sulfur-containing compounding agent and rubber, are accelerated with good balance, and of tensile at break (TB), elongation at break (EB), modulus, and tan δ at low and high temperatures are balanced so that a compound having excellent tensile at break, elongation at break, low heat build-up, and wet grip performance can be obtained without diminishing workability, and they achieved the present technology.

That is, the present technology provides the following rubber composition and a pneumatic tire using the same.

1. A rubber composition obtained by blending from 1 to 100 parts by mass of carbon black and/or from 10 to 150 parts by mass of inorganic filler, from 1 to 30 parts by mass of sulfur-containing compounding agent, and from 0.1 to 20 parts by mass of tin oxide compound, per 100 parts by mass of sulfur-crosslinkable diene rubber.

2. The rubber composition according to above item 1, wherein the tin oxide compound is a compound represented by formula (1) below:

[Formula 1]

(In the formula, n is 1 or 2, and $R^1$ and $R^2$ are each independently an optionally substituted hydrocarbon group having from 1 to 20 carbon atoms, a hydroxy group, an alkoxy group having from 1 to 20 carbon atoms, an —NRR' group (wherein R and R' are each independently an optionally substituted hydrocarbon group having from 1 to 20 carbons, or hydrogen), a halogen, or hydrogen.)

3. The rubber composition according to the above item 1 or 2, wherein the sulfur-containing compounding agent is at least one type selected from the group consisting of sulfur, sulfur-containing silane coupling agents, and sulfur-containing vulcanization accelerators.

4. The rubber composition according to any one of the above items 1 to 3, wherein the inorganic filler is silica, the sulfur-containing compounding agent contains at least a sulfur-containing silane coupling agent, and the amount of the sulfur-containing silane coupling agent is from 1 to 15 parts by mass per 100 parts by mass of the diene rubber.

5. A pneumatic tire that uses the rubber composition according to any one of the above items 1 to 4 in a cap tread.

The rubber composition of the present technology and the pneumatic tire of the present technology have excellent low heat build-up, wet grip performance, tensile at break, elongation at break, and modulus without diminishing workability.

BRIEF DESCRIPTION OF THE DRAWINGS

FIG. 1 is a cross-sectional view schematically illustrating a partial cross section in the meridian direction of a tire in an example of an embodiment of the pneumatic tire of the present technology.

DETAILED DESCRIPTION

The present technology is described in detail below.

The present technology is a rubber composition obtained by blending from 1 to 100 parts by mass of carbon black and/or from 10 to 150 parts by mass of inorganic filler, from 1 to 30 parts by mass of sulfur-containing compounding agent, and from 0.1 to 20 parts by mass of tin oxide compound, per 100 parts by mass of sulfur-crosslinkable diene rubber.

In the present technology, by blending a sulfur-containing compounding agent and a tin oxide compound into a sulfur-crosslinkable diene rubber, the chemical reaction of the sulfur-containing compounding agent and rubber is accelerated with good balance, and tensile at break (TB), elongation at break (EB), modulus, and tan δ at low and high temperatures are balanced so that a compound having excellent tensile at break, elongation at break, low heat build-up, and wet grip performance can be obtained without diminishing workability.

In the structure of the tin oxide compound, the tin that forms >Sn=O accelerates a condensation reaction between sulfur-containing silane coupling agents and silica, similar to general tin compounds. Additionally, compared to a general tetravalent organotin compound that does not have an >Sn=O bond, its electrophilicity (particularly electrophilicity in the p orbital) is high and it readily interacts with elements having lone electron pairs such as oxygen and sulfur. In addition, in the tin oxide compound, the space in the vicinity of the tin atom is relatively large and steric hindrance is small, so the complex readily interacts with high periodic elements (with large atomic radii) such as sulfur. On the other hand, it is thought that, compared to general divalent tin compounds, tin oxide compounds are not readily deactivated by a desulfurization reaction from a polysulfide bond, and therefore, chemical reactions between the sulfur-containing compounding agent and rubber are efficiently accelerated by the tin oxide compound, and as a result, rubber having excellent low heat build-up, wet grip performance, tensile at break, elongation at break, and modulus can be obtained without diminishing workability. Note that the mechanism described above is a deduction by the present inventors, and, even if the mechanism differs from the above, such mechanisms are within the scope of the present technology.

The diene rubber contained in the rubber composition of the present technology is not particularly limited as long as the rubber is sulfur-crosslinkable. Specific examples include natural rubber (NR), isoprene rubber (IR), butadiene rubber (BR), aromatic vinyl-conjugated diene copolymer rubber, acrylonitrile-butadiene copolymer rubber (NBR), butyl rubber (IIR), butyl halide rubber (Br-IIR, Cl-IIR), and chloroprene rubber (CR).

In the present technology, it is preferable to use an aromatic vinyl-conjugated diene copolymer rubber as the diene rubber in that a tire with excellent wet grip performance can be obtained.

Examples of aromatic vinyl-conjugated diene copolymer rubbers include styrene-butadiene copolymer rubber (SBR) and styrene-isoprene copolymer rubber. Of these, a styrene-butadiene copolymer rubber (SBR) is preferable in that a tire with excellent wet grip performance can be obtained.

The weight average molecular weight of the diene rubber is preferably from 200,000 to 2,500,000 from the perspective of having excellent workability, low heat build-up, wet grip performance, tensile at break, elongation at break, and modulus. In the present technology, the weight average molecular weight (Mw) of the diene rubber is measured by gel permeation chromatography (GPC) on the basis of standard polystyrene using tetrahydrofuran as a solvent.

There is no particular limitation on the production of the diene rubber. Examples thereof include conventionally known products. A single diene rubber can be used, or a combination of two or more types can be used.

The carbon black that can be blended into the rubber composition of the present technology is not particularly limited. Examples thereof include conventionally known production methods. A single carbon black can be used or a combination of two or more carbon blacks can be used.

In the present technology, the amount of carbon black may be from 1 to 100 parts by mass per 100 parts by mass of the sulfur-crosslinkable diene rubber. The amount of carbon black is preferably from 3 to 90 parts by mass and more preferably from 5 to 80 parts by mass per 100 parts by mass of the diene rubber from the perspective of having excellent workability, low heat build-up, wet grip performance, tensile at break, elongation at break, and modulus.

The inorganic fillers that can be blended into the rubber composition of the present technology are not particularly limited. Examples include silica, calcium carbonate, clay, and talc. One preferred mode is for the inorganic filler to be silica. In the present technology, the inorganic filler excludes the above-mentioned carbon black.

The silica contained in the rubber composition of the present technology is not particularly limited. It can be any conventional, publicly known silica that is blended in rubber compositions used in tires and the like.

Examples of silicas include wet silica, dry silica, fumed silica, and diatomaceous earth. The silica preferably contains a wet silica from the perspective of the reinforcement of the rubber.

In addition, the silica preferably has a cetyltrimethylammonium bromide (CTAB) adsorption specific surface area of from 100 to 300 $m^2/g$ and more preferably from 140 to 200 $m^2/g$ from the perspective of having excellent low heat build-up, workability, wet grip performance, tensile at break, elongation at break, and modulus.

Here, the CTAB adsorption specific surface area is an alternative characteristic of the surface area that can be utilized by silica for adsorption to the silane coupling agent and is a value determined by measuring the amount of CTAB adsorption to the silica surface in accordance with JIS (Japanese Industrial Standard) K 6217-3:2001 "Part 3: How to Determine Specific Surface Area—CTAB Adsorption Method".

The inorganic filler can be used alone or as a combination of two or more types of inorganic fillers.

When the inorganic filler is silica, one preferred mode is for the sulfur-containing compounding agent to contain at least a sulfur-containing silane coupling agent from the perspective of having excellent low heat build-up, workability, wet grip performance, tensile at break, elongation at break, and modulus.

In the present technology, the content of the inorganic filler is from 10 to 150 parts by mass per 100 parts by mass of the diene rubber, and from the perspective of having excellent low heat build-up, workability, wet grip performance, tensile at break, elongation at break, and modulus, it is preferably from 20 to 120 parts by mass, and more preferably from 40 to 100 parts by mass.

The sulfur-containing compounding agent contained in the present technology is not particularly limited as long as the compound has sulfur atoms. The sulfur-containing compounding agent may be at least one type selected from the group consisting of sulfur, sulfur-containing silane coupling agents, and sulfur-containing vulcanization accelerators, for example.

The sulfur-containing silane coupling agent is not particularly limited as long as it is a silane coupling agent having a sulfur atom. Examples thereof include polysulfide-based silane coupling agents having polysulfide bonds with at least three sulfur atoms such as bis(3-triethoxysilylpropyl) tetrasulfide and 3-trimethoxysilylpropyl benzothiazole tetrasulfide; disulfide-based silane coupling agents such as bis(3-triethoxysilylpropyl)disulfide; mercapto-based silane coupling agents such as γ-mercaptopropyltriethoxysilane, 3-[ethoxybis(3,6,9,12,15-pentaoxaoctacosane-1-yloxy)silyl]-1-propanethiol; thiocarboxylate-based silane coupling agents such as 3-octanoylthiopropyl triethoxysilane; and thiocyanate-based silane coupling agents such as 3-thiocyanatepropyl triethoxysilane.

Of these, a polysulfide-based silane coupling agent having polysulfide bonds with at least two sulfur atoms is preferable, a polysulfide-based silane coupling agent having polysulfide bonds with from two to five sulfur atoms is more preferable, and bis(3-triethoxysilylpropyl)tetrasulfide or bis (3-triethoxysilylpropyl)disulfide is even more preferable from the perspective of having excellent low heat build-up, workability, wet grip performance, tensile at break, elongation at break, and modulus.

The present inventors discovered that when silica, the sulfur-containing silane coupling agent described below, and a tin oxide compound are used in the diene rubber, it is preferable for it to be a polysulfide-based silane coupling agent having a polysulfide bond with not less than two sulfur atoms, from the perspective of having excellent low heat build-up, workability, wet grip performance, tensile at break, elongation at break, and modulus. Here, a sulfide bond having not less than two sulfur atoms is represented by —(S)$_X$— (X:2 or greater).

A polysulfide bond is a bond having a plurality of two and/or more sulfur atoms between two carbon atoms. Sulfur atoms bonded to carbon atoms are difficult to desulfurize, and sulfur atoms having sulfur atoms bonded to both sides are easy to desulfurize. In the present technology, the present inventors surmise that the tin oxide compound suppresses, to an appropriate degree, deactivation of the tin oxide compound due to the desulfurization of sulfur atoms from the polysulfide-based silane coupling agent having at least three sulfur atoms, and the chemical reactions between the sulfur-containing compounding agent and the rubber (for example, the chemical reaction between sulfur and rubber, between the sulfur-containing vulcanization accelerator and rubber, or between silica and the sulfur-containing silane coupling agent and rubber) are accelerated, and this contributes to better low heat generation, wet grip performance, workability, tensile at break, elongation at break, and modulus. Of these, the chemical reaction of the silica, the sulfur-containing silane coupling agent, and the rubber is particularly accelerated. Specifically, two reactions—the condensation reaction of the silica and the sulfur-containing silane coupling agent and the crosslinking reaction of the sulfur-containing silane coupling agent and the rubber—are accelerated simultaneously with good balance.

The sulfur-containing vulcanization accelerator is not particularly limited as long as it is a vulcanization accelerator that has sulfur atoms and can be used in a rubber composition. Here, sulfur-containing vulcanization accelerators are assumed to include sulfur-containing vulcanization acceleration aids. Examples of sulfur-containing vulcanization accelerators include thiuram compounds such as tetramethylthiuram disulfide and tetramethylthiuram monosulfide; dithiocarbamates such as zinc dimethyldithiocarbamate; thiazole compounds such as 2-mercaptobenzothiazole and dibenzothiazyl disulfide; and sulfenamide compounds such as N-cyclohexyl-2-benzothiazole sulfenamide and N-t-butyl-2-benzothiazole sulfenamide.

Of these, N-cyclohexyl-2-benzothiazolyl sulfenamide and N,N-dicyclohexyl-2-benzothiazolyl sulfenamide are preferable from the perspective of having excellent workability, low heat build-up, wet grip performance, tensile at break, elongation at break, and modulus.

The sulfur-containing compounding agent can be used alone or as a combination of two or more types.

In the present technology, the amount of the sulfur-containing compounding agent is from 1 to 30 parts by mass per 100 parts by mass of the diene rubber. The amount of the sulfur-containing compounding agent is preferably from 1.5 to 25 parts by mass and more preferably from 2 to 20 parts by mass per 100 parts by mass of the diene rubber from the perspective of having excellent workability, low heat build-up, wet grip performance, tensile at break, elongation at break, and modulus.

The amount of sulfur is preferably from 0.1 to 10 parts by mass per 100 parts by mass of the diene rubber.

The amount of the sulfur-containing vulcanization accelerator is preferably from 0.1 to 10 parts by mass per 100 parts by mass of the diene rubber.

The amount of the sulfur-containing silane coupling agent is preferably from 1 to 15 parts by mass and more preferably from 3 to 12 parts by mass per 100 parts by mass of the diene rubber from the perspective of having excellent workability, low heat build-up, wet grip performance, tensile at break, elongation at break, and modulus.

The tin oxide compound contained in the rubber composition of the present technology is not particularly limited as long as the compound has a Sn=O bond.

The tin oxide compound can contain an organic group. One preferred mode is for the organic group to be bonded to a tin atom. Examples of the organic group include hydrocarbon groups that may have a hetero atom like an oxygen atom, a nitrogen atom, or a sulfur atom. Examples of the hydrocarbon group include aliphatic hydrocarbon groups, alicyclic hydrocarbon groups, aromatic hydrocarbon groups, and combinations thereof, and the hydrocarbon group may be either straight or branched, and may have a saturated bond. Specific examples include an optionally substituted hydrocarbon group having from 1 to 20 carbon atoms, an alkoxy group having from 1 to 20 carbon atoms, and an —NRR' group (wherein R and R' are each independently a hydrocarbon group having from 1 to 20 carbons, and/or hydrogen). Examples of substituents include a hydroxy group, a carbonyl group, a cyano group, an amino group, a halogen, and the like.

Furthermore, one preferred mode is for a functional group such as a hydroxyl group (—OH group), amino group (—NH$_2$ group), or halogen (for example, —F, —Cl, —Br, —I), or hydrogen (—H), to be bonded to a tin atom of the tin oxide compound.

Among these, a compound represented by formula (1) below is preferred as the tin oxide compound from the perspective of having better low heat build-up, workability, wet grip performance, tensile at break, elongation at break, and modulus. The compound represented by formula (1) has a Sn=O bond.

[Formula 2]

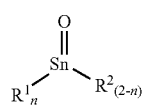

(1)

(In the formula, n is 1 or 2, and R$^1$ and R$^2$ are each independently an optionally substituted hydrocarbon group having from 1 to 20 carbon atoms, a hydroxy group, an alkoxy group having from 1 to 20 carbon atoms, an —NRR' group (wherein R and R' are each independently a hydrocarbon group having from 1 to 20 carbons, or hydrogen), a halogen, or hydrogen.)

Examples of optionally substituted hydrocarbon groups having from 1 to 20 carbons include a methyl group, an ethyl group, a propyl group, an octyl group, a decyl group, and a dodecyl group.

Examples of alkoxy groups having from 1 to 20 carbon atoms include a methoxy group, an ethoxy group, a propoxy group, an octyloxy group, a decyloxy group, and a dodecyloxy group.

In the —NRR' group, R and R' are each independently an optionally substituted hydrocarbon group having from 1 to 20 carbons, or hydrogen, and the optionally substituted hydrocarbon group having from 1 to 20 carbons is the same as above. Examples of the —NRR' group include a dimethylamino group, a diethylamino group, a dicyclohexyl group, a diphenyl group, an amino group, and the like.

Examples of halogens include —F, —Cl, —Br, and —I.

The tin oxide compound can be a compound containing at least a compound represented by formula (1).

Examples of the tin oxide compound include di-n-octyltin oxide represented by the formula below:

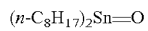 [Formula 3]

mono-n-octyltin oxide, and compounds containing mono-n-octyltin oxide represented by the formula below:

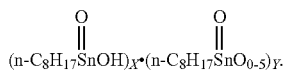 [Formula 4]

In the present technology, the content of the tin oxide compound is from 0.1 to 20 parts by mass per 100 parts by mass of the diene rubber, and from the perspective of having excellent low heat build-up, workability, wet grip performance, tensile at break, elongation at break, and modulus, it is preferably from 0.3 to 10 parts by mass per 100 parts by mass of the diene rubber.

The rubber composition of the present technology may further contain a silane coupling agent that does not contain sulfur.

In addition, when the inorganic filler is silica, one preferred mode is for the rubber composition of the present technology to further contain a silane coupling agent that does not contain sulfur.

The silane coupling agent that does not contain sulfur is not particularly limited. Examples thereof include aminosilane coupling agents, epoxysilane coupling agents, and hydroxysilane coupling agents.

Furthermore, the amount of the silane coupling agent that does not contain sulfur is preferably from 1 to 15 parts by mass and more preferably from 3 to 12 parts by mass per 100 parts by mass of the diene rubber from the perspective of having excellent workability, low heat build-up, wet grip performance, tensile at break, elongation at break, and modulus.

The rubber composition of the present technology may further contain additives as necessary within a scope that does not inhibit the effect or purpose thereof.

Examples of additives include various additives typically used in rubber compositions such as zinc oxide, stearic acid, antiaging agents, processing aids, aroma oils, liquid polymers, terpene-based resins, thermosetting resins, vulcanizing agents other than sulfur, vulcanizing accelerators not having sulfur atoms, and vulcanizing accelerator aids contained in the rubber composition of the present technology.

The production method of the rubber composition of the present technology is not particularly limited. A specific example is a method of mixing and kneading each of the components described above using a known method and apparatus (for example, a Banbury mixer, a kneader, a roller, or the like).

In addition, the rubber composition of the present technology can be vulcanized or crosslinked under conventional, publicly known vulcanizing or crosslinking conditions.

The rubber composition of the present technology can be used, for example, in a tire, a belt, a hose, or the like.

The pneumatic tire of the present technology will be described hereinafter.

The pneumatic tire of the present technology is a pneumatic tire in which the rubber composition of the present technology is used in the cap tread. The rubber composition used in the present technology is not particularly limited as long as it is the rubber composition of the present technology. The cap tread of the pneumatic tire of the present technology is produced using the rubber composition of the present technology.

The pneumatic tire of the present technology will be described hereafter with reference to the attached drawings. The pneumatic tire of the present technology is not limited to the accompanying drawings.

FIG. 1 is a cross-sectional view schematically illustrating a partial cross-section in the meridian direction of a tire in an example of an embodiment of the pneumatic tire of the present technology. In FIG. 1, reference numeral 1 is a cap tread, reference numeral 2 is a side wall, and reference numeral 3 is a bead.

In FIG. 1, two layers of a carcass 4, formed by arranging reinforcing cords extending in a tire circumferential direction in a tire circumferential direction at a predetermined pitch and embedding these reinforcing cords in a rubber layer, are disposed extending between left and right beads 3. Both ends of the carcass 4 are made to sandwich a bead filler 6 and are folded back around a bead core 5 that is embedded in the beads 3 in a tire axial direction from the inside to the outside. An inner liner 7 is disposed inward of the carcass 4. Two layers of a belt 8, formed by arranging reinforcing cords extending inclined to the tire circumferential direction in the tire axial direction at a predetermined pitch and embedding these reinforcing cords in a rubber layer, are disposed on an outer circumferential side of the carcass 4 of the cap tread 1. The reinforcing cords of the two layers of the belt 8 cross interlaminarly so that the incline directions with respect to the tire circumferential direction are opposite each other. A belt cover 9 is disposed on the outer circumferential side of the belt 8. The cap tread 1 is formed from a cap tread rubber layer 12 on the outer circumferential side of the belt cover 9. A side rubber layer 13 is disposed outward of the carcass 4 of each side wall 2, and a rim cushion rubber layer 14 is provided outward of the portion of the carcass 4 that is folded back around each of the beads 3.

The cap tread 1 is constructed from the rubber composition of the present technology.

The pneumatic tire of the present technology is not particularly limited with the exception that the rubber composition of the present technology is used for a pneumatic tire, and, for example, the tire can be produced in accordance with a conventionally known method. In addition to ordinary air or air with an adjusted oxygen partial pressure, inert gasses such as nitrogen, argon, and helium can be used as the gas with which the tire is filled.

EXAMPLES

The present technology is described below in detail using working examples but the present technology is not limited to such working examples.

<Production of Unvulcanized Rubber Composition>

According to the composition (parts by mass) shown in Tables 1 and 2, the components other than the vulcanization components (vulcanization accelerator and sulfur), were kneaded for 5 minutes in a 1.7-liter sealed Banbury Mixer.

The composition was then discharged from the mixer and cooled to room temperature. Next, an unvulcanized rubber composition was obtained by placing the rubber composition in an open roll, adding the vulcanization components, and kneading the mixture.

<Production of Vulcanized Rubber>

Next, the unvulcanized rubber composition obtained as described above was press-vulcanized for 20 minutes at 160° C. in a prescribed die to prepare a vulcanized rubber test piece.

<Evaluation>

The properties of the unvulcanized rubber composition and the vulcanized rubber test piece obtained as described above were measured via the test methods given below. The results are shown in Tables 1 and 2. Table 1 shows the results as index values based on the value for Comparative Example 1 being 100. Table 2 shows the results as index values based on the value for Comparative Example 8 being 100.

Measurement of tan δ

The value of tan δ was measured for the vulcanized rubber test piece using a viscoelastic spectrometer manufactured by Iwamoto Seisakusho at an elongation deformation distortion factor of 10±2%, a vibration frequency of 20 Hz, and a temperature of 0° C. or 50° C. A higher value of tan δ indicates better wet grip performance. A lower value of tan δ indicates lower heat build-up.

Measurement of Tensile Stress (Modulus), Tensile Strength (Tensile at Break, TB), and Elongation at Break (EB)

A JIS no. 3 dumbbell-shaped test piece was punched out from the vulcanized rubber test piece, and a tensile test was performed at a tensile speed of 500 mm/min in accordance with JIS K 6251. The 100% modulus, the tensile strength, and the elongation at break of the vulcanized rubber test piece were measured at room temperature. Higher index values indicate a better modulus, tensile strength, and elongation at break, which are preferred.

Measurement of Viscosity

The Mooney viscosity ML (1+4) of the unvulcanized rubber composition at 100° C. was determined using an L-shaped rotor in accordance with JIS K 6300. A lower index value indicates lower viscosity of the unvulcanized rubber composition, which is preferred.

Measurement of Scorch Time

The time (min) required for the viscosity of the unvulcanized rubber composition to increase 5 points at 125° C. was measured in accordance with JIS K 6300. A higher index value indicates better workability, which is preferred.

TABLE 1

| | Comparative Example | Working Example | | | |
|---|---|---|---|---|---|
| | 1 | 1 | 2 | 3 | 4 |
| E-SBR | 100 | 100 | 100 | 100 | 100 |
| Di-n-octyltin oxide | | 0.4 | 0.9 | | |
| Mono-n-octyltin oxide | | | | 0.3 | 0.7 |
| Tetra-n-octyltin | | | | | |
| Di-n-octyltin dichloride | | | | | |
| Tin bis(2-ethylhexanoate) | | | | | |
| Silica | 60 | 60 | 60 | 60 | 60 |
| Carbon black | 5 | 5 | 5 | 5 | 5 |
| Zinc oxide | 3 | 3 | 3 | 3 | 3 |
| Stearic acid | 1 | 1 | 1 | 1 | 1 |
| Antiaging agent | 1 | 1 | 1 | 1 | 1 |
| Sulfur-containing silane coupling agent | 5 | 5 | 5 | 5 | 5 |
| Oil | 6 | 6 | 6 | 6 | 6 |
| Sulfur | 2 | 2 | 2 | 2 | 2 |
| Sulfur-containing vulcanization accelerator (CZ) | 1 | 1 | 1 | 1 | 1 |
| Vulcanization accelerator (DPG) | 0.5 | 0.5 | 0.5 | 0.5 | 0.5 |
| Physical properties | | | | | |
| Mooney viscosity (viscosity index) | 100 | 104 | 102 | 102 | 104 |
| Mooney scorch (vulcanization index) | 100 | 98 | 96 | 114 | 112 |
| M100 (tensile stress index) | 100 | 106 | 112 | 102 | 106 |
| TB (tensile at break index) | 100 | 115 | 111 | 116 | 106 |
| EB (elongation at break index) | 100 | 109 | 106 | 107 | 101 |
| tanδ (0° C.: wet grip performance index) | 100 | 114 | 115 | 120 | 124 |
| tanδ (50° C.: low heat build-up index) | 100 | 93 | 89 | 88 | 83 |

| | Comparative Example | | | | | |
|---|---|---|---|---|---|---|
| | 2 | 3 | 4 | 5 | 6 | 7 |
| E-SBR | 100 | 100 | 100 | 100 | 100 | 100 |
| Di-n-octyltin oxide | | | | | | |
| Mono-n-octyltin oxide | | | | | | |
| Tetra-n-octyltin | 0.6 | 1.5 | | | | |
| Di-n-octyltin dichloride | | | 0.4 | 1.1 | | |
| Tin bis(2-ethylhexanoate) | | | | | 1.4 | 2.8 |
| Silica | 60 | 60 | 60 | 60 | 60 | 60 |
| Carbon black | 5 | 5 | 5 | 5 | 5 | 5 |
| Zinc oxide | 3 | 3 | 3 | 3 | 3 | 3 |
| Stearic acid | 1 | 1 | 1 | 1 | 1 | 1 |
| Antiaging agent | 1 | 1 | 1 | 1 | 1 | 1 |
| Sulfur-containing silane coupling agent | 5 | 5 | 5 | 5 | 5 | 5 |
| Oil | 6 | 6 | 6 | 6 | 6 | 6 |
| Sulfur | 2 | 2 | 2 | 2 | 2 | 2 |
| Sulfur-containing vulcanization accelerator (CZ) | 1 | 1 | 1 | 1 | 1 | 1 |
| Vulcanization accelerator (DPG) | 0.5 | 0.5 | 0.5 | 0.5 | 0.5 | 0.5 |
| Physical properties | | | | | | |
| Mooney viscosity (viscosity index) | 106 | 104 | 108 | 109 | 105 | 110 |
| Mooney scorch (vulcanization index) | 101 | 99 | 126 | 127 | 92 | 65 |
| M100 (tensile stress index) | 94 | 90 | 101 | 105 | 91 | 85 |
| TB (tensile at break index) | 103 | 104 | 93 | 94 | 67 | 72 |
| EB (elongation at break index) | 101 | 104 | 95 | 93 | 80 | 91 |
| tanδ (0° C.: wet grip performance index) | 107 | 109 | 116 | 118 | 105 | 107 |
| tanδ (50° C.: low heat build-up index) | 101 | 106 | 101 | 94 | 89 | 89 |

TABLE 2

|  | Comparative Example 8 | Working Example 5 | Working Example 6 | Comparative Example 9 | Comparative Example 10 | Comparative Example 11 |
|---|---|---|---|---|---|---|
| E-SBR | 100 | 100 | 100 | 100 | 100 | 100 |
| Di-n-octyltin oxide |  | 0.8 |  |  |  |  |
| Mono-n-octyltin oxide |  |  | 0.6 |  |  |  |
| Tetra-n-octyltin |  |  |  | 1.1 |  |  |
| Di-n-octyltin dichloride |  |  |  |  | 0.9 |  |
| Tin bis(2-ethylhexanoate) |  |  |  |  |  | 0.8 |
| Carbon black | 5 | 5 | 5 | 5 | 5 | 5 |
| Zinc oxide | 3 | 3 | 3 | 3 | 3 | 3 |
| Stearic acid | 1 | 1 | 1 | 1 | 1 | 1 |
| Antiaging agent | 1 | 1 | 1 | 1 | 1 | 1 |
| Oil | 6 | 6 | 6 | 6 | 6 | 6 |
| Sulfur | 2 | 2 | 2 | 2 | 2 | 2 |
| Sulfur-containing vulcanization accelerator (CZ) | 1 | 1 | 1 | 1 | 1 | 1 |
| Vulcanization accelerator (DPG) | 0.5 | 0.5 | 0.5 | 0.5 | 0.5 | 0.5 |
| Physical properties | | | | | | |
| Mooney viscosity (viscosity index) | 100 | 101 | 100 | 103 | 105 | 104 |
| Mooney scorch (vulcanization index) | 100 | 120 | 108 | 101 | 98 | 104 |
| M100 (tensile stress index) | 100 | 106 | 106 | 102 | 103 | 102 |
| TB (tensile at break index) | 100 | 110 | 105 | 102 | 102 | 102 |
| EB (elongation at break index) | 100 | 113 | 103 | 98 | 99 | 97 |
| tanδ (0° C.: wet grip performance index) | 100 | 108 | 106 | 99 | 98 | 102 |
| tanδ (50° C.: low heat build-up index) | 100 | 93 | 94 | 102 | 101 | 100 |

Details of the components indicated in Tables 1 and 2 are as follows.

E-SBR: emulsification-polymerized SBR: Nipol 1502, manufactured by Zeon Corporation Di-n-octyltin oxide: compound represented by formula below; DOTO, manufactured by Hokko Chemical Industry Co., Ltd.

$$(n\text{-}C_8H_{17})_2Sn\!=\!O \qquad \text{[Formula 5]}$$

Mono-n-octyltin oxide: compound containing mono-n-octyltin oxide, represented by formula below; MOTO, manufactured by Hokko Chemical Industry Co., Ltd.

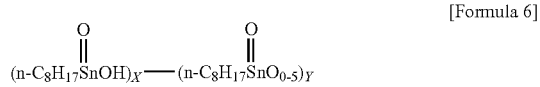

[Formula 6]

$$(n\text{-}C_8H_{17}\overset{O}{\overset{\|}{Sn}}OH)_X\!\!-\!\!(n\text{-}C_8H_{17}\overset{O}{\overset{\|}{Sn}}O_{0\text{-}5})_Y$$

Tetra-n-octyltin: $(n\text{-}C_8H_{17})_4Sn$; TOT, manufactured by Hokko Chemical Industry Co., Ltd.

Di-n-octyltin dichloride: $(n\text{-}C_8H_{17})_2SnCl_2$; DOTC, manufactured by Hokko Chemical Industry Co., Ltd.

Tin bis(2-ethylhexanoate): manufactured by Kishida Chemical Co., Ltd.

Silica: wet silica, CTAB adsorption specific surface area: 170 m$^2$/g; Nipsil AQ, manufactured by Japan Silica Corporation Carbon black: Shoblack N339M, manufactured by Showa Cabot K.K.

Zinc oxide: Zinc White No. 3, manufactured by Seido Chemical Industry Co., Ltd.

Stearic acid: stearic acid, manufactured by Nippon Oil & Fats Co., Ltd.

Antiaging agent: antiaging agent (S-13); Antigen 6C, manufactured by Sumitomo Chemical Co., Ltd.

Sulfur-containing silane coupling agent: bis(triethoxysilylpropyl)tetrasulfide; Has —S$_4$— as polysulfide. Both terminals of —S$_4$— are bonded to carbon atoms. Si69, manufactured by Evonik Degussa Corp.

Oil: Extract No. 4S, manufactured by Showa Shell Sekiyu K.K.

Sulfur: oil-treated sulfur, manufactured by Karuizawa Refinery Ltd.

Sulfur-containing vulcanization accelerator (CZ): N-cyclohexyl-2-benzothiazolyl sulfenamide; Sanceller CM-PO, manufactured by Sanshin Chemical Industry Co., Ltd.

Vulcanization accelerator (DPG): diphenylguanidine; Sanceller D-G, manufactured by Sanshin Chemical Industry Co., Ltd.

As is clear from the results shown in Table 1, when the rubber composition contained carbon black and inorganic filler, in Comparative Examples 2 and 3 which contained tetra-n-octyltin as a tin compound other than a tin oxide compound, modulus and low heat build-up (50° C. tan δ) decreased and improvements were not seen in tensile strength and elongation at break, based on Comparative Example 1 in which the tin oxide compound was blank. In Comparative Examples 4 and 5 which contained di-n-octyltin dichloride as a tin compound other than a tin oxide compound, Mooney viscosity, tensile strength, and elongation at break decreased, and in Comparative Example 4, improvement was not seen in modulus. In Comparative Examples 6 and 7 which contained tin bis(2-ethylhexanoate) as a tin compound other than a tin oxide compound, Mooney viscosity, Mooney scorch, modulus, tensile strength, and elongation at break decreased.

In contrast, in Working Examples 1 to 4, low heat build-up, wet grip performance, tensile at break, elongation at break, and modulus were excellent without diminishing workability.

As is clear from the results shown in Table 2, when the rubber composition contained carbon black, in Comparative Example 9 which contained tetra-n-octyltin as a tin compound other than a tin oxide compound, Mooney viscosity was higher, no real improvement was seen in modulus or tensile strength, and elongation at break, wet grip performance, and low heat build-up decreased, based on Comparative Example 8 in which the tin oxide compound was blank. In Comparative Example 10 which contained di-n-octyltin dichloride as a tin compound other than a tin oxide compound, Mooney scorch was shorter, no real improvements were seen in tensile strength and modulus, and elongation at break, wet grip performance, and low heat build-up decreased. In Comparative Example 11 which contained tin bis(2-ethylhexanoate) as a tin compound other than a tin oxide compound, Mooney viscosity increased, no real improvements were seen in modulus and tensile strength, and elongation at break decreased.

In contrast, in Working Examples 5 and 6, low heat build-up, wet grip performance, tensile at break, elongation at break, and modulus were excellent without diminishing workability.

The invention claimed is:

1. A rubber composition wherein from 1 to 100 parts by mass of carbon black, from 10 to 150 parts by mass of inorganic filler, from 1 to 30 parts by mass of sulfur-containing compounding agent, and from 0.1 to 20 parts by mass of tin oxide compound, are blended per 100 parts by mass of sulfur-crosslinkable diene rubber, wherein the tin oxide compound contains at least a compound represented by formula (1) below:

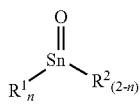 (1)

(in the formula (1), n is 1 or 2, and $R^1$ is a hydrocarbon group having from 1 to 20 carbon atoms, and $R^2$ is at least one selected from the group consisting of a hydroxy group, $-NH_2$, a halogen and hydrogen.

2. The rubber composition according to claim 1, wherein the sulfur-containing compounding agent is at least one type selected from the group consisting of sulfur, sulfur-containing silane coupling agents, and sulfur-containing vulcanization accelerators.

3. The rubber composition according to claim 1, wherein the inorganic filler is silica, the sulfur-containing compounding agent contains at least a sulfur-containing silane coupling agent, and an amount of the sulfur-containing silane coupling agent is from 1 to 15 parts by mass per 100 parts by mass of the diene rubber.

4. A pneumatic tire that uses the rubber composition described in claim 1 in a cap tread.

* * * * *